(12) United States Patent
Newton et al.

(10) Patent No.: US 9,245,252 B2
(45) Date of Patent: Jan. 26, 2016

(54) METHOD AND SYSTEM FOR DETERMINING ON-LINE INFLUENCE IN SOCIAL MEDIA

(75) Inventors: Christopher Daniel Newton, Douglas (CA); Marcel Albert Lebrun, Fredericton (CA); Christopher Bennett Ramsey, Fredericton (CA)

(73) Assignee: salesforce.com, inc., San Francisco, CA (US)

( * ) Notice: Subject to any disclaimer, the term of this patent is extended or adjusted under 35 U.S.C. 154(b) by 893 days.

(21) Appl. No.: 12/437,418

(22) Filed: May 7, 2009

(65) Prior Publication Data

US 2009/0281851 A1 Nov. 12, 2009

Related U.S. Application Data

(63) Continuation-in-part of application No. 12/174,345, filed on Jul. 18, 2008.

(60) Provisional application No. 61/051,202, filed on May 7, 2008.

(51) Int. Cl.
*G06F 15/16* (2006.01)
*G06Q 10/00* (2012.01)
*G06Q 10/10* (2012.01)
*G06Q 30/02* (2012.01)

(52) U.S. Cl.
CPC ............ *G06Q 10/10* (2013.01); *G06Q 30/0201* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |

(Continued)

OTHER PUBLICATIONS

Linear Combination—Wikepedia (http://en.wikpedia.org/wiki/Linear_combination (accessed Apr. 5, 2012).*

(Continued)

*Primary Examiner* — Ariel Yu
(74) *Attorney, Agent, or Firm* — Ingrassia Fisher & Lorenz, P.C.

(57) ABSTRACT

A method and system for determining on-line influence in social media is disclosed. A recursive site influence modeling module computes a site influence from aggregated viral properties of content hosted by the site and further integrates, in the formulation of the site influence model, the influence of commentors, commenting on the hosted content, and the influence of individuals cited in the content. The influence of the commentors and individuals is calculated by aggregating viral properties of related content and as well by taking into account the influence of outlets owned by the commentors and the individuals.

17 Claims, 5 Drawing Sheets

(56) References Cited

U.S. PATENT DOCUMENTS

| | | |
|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,260,041 B1 | 7/2001 | Gonzalez |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,332,141 B2 | 12/2001 | Gonzalez |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,584,470 B2 | 6/2003 | Veale |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,694,307 B2 | 2/2004 | Julien |
| 6,697,807 B2 | 2/2004 | McGeachie |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B2 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,895,405 B1 | 5/2005 | Choi |
| 6,907,566 B1 | 6/2005 | McElfresh et al. |
| 7,047,244 B2 | 5/2006 | McGeachie |
| 7,100,111 B2 | 8/2006 | McElfresh et al. |
| 7,185,065 B1 | 2/2007 | Holtzman |
| 7,188,078 B2 | 3/2007 | Arnett |
| 7,188,079 B2 | 3/2007 | Arnett |
| 7,197,470 B1 | 3/2007 | Arnett |
| 7,269,590 B2 | 9/2007 | Hull et al. |
| 7,281,022 B2 | 10/2007 | Gruhl et al. |
| 7,340,411 B2 | 3/2008 | Cook |
| 7,373,599 B2 | 5/2008 | McElfresh et al. |
| 7,406,501 B2 | 7/2008 | Szeto et al. |
| 7,426,557 B2 | 9/2008 | Gruhl et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,685,091 B2 | 3/2010 | Boone et al. |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,933,843 B1 | 4/2011 | von Groll et al. |
| 7,945,653 B2 | 5/2011 | Zuckerberg et al. |
| 7,970,895 B2 | 6/2011 | Gruhl et al. |
| 7,974,983 B2 | 7/2011 | Goeldi |
| 7,991,764 B2 | 8/2011 | Rathod |
| 8,005,896 B2 | 8/2011 | Cheah |
| 8,010,539 B2 | 8/2011 | Blair-Goldensohn et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,166,013 B2 | 4/2012 | Bandaru et al. |
| 8,214,272 B2 * | 7/2012 | Glassman et al. .............. 705/35 |
| 8,275,836 B2 | 9/2012 | Beaven et al. |
| 8,554,601 B1 * | 10/2013 | Marsh et al. ................ 705/7.32 |
| 2001/0000192 A1 | 4/2001 | Gonzalez |
| 2001/0018687 A1 | 8/2001 | Gonzalez |
| 2001/0032203 A1 | 10/2001 | Gonzalez |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0194055 A1 * | 12/2002 | Takakura et al. ................ 705/10 |
| 2003/0004745 A1 * | 1/2003 | Takakura et al. ................ 705/1 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0010551 A1 | 1/2005 | McGeachie |
| 2005/0050555 A1 | 3/2005 | Exley et al. |
| 2005/0091098 A1 | 4/2005 | Brodersen et al. |
| 2005/0210065 A1 | 9/2005 | Nigam |
| 2005/0256905 A1 | 11/2005 | Gruhl et al. |
| 2005/0256949 A1 | 11/2005 | Gruhl et al. |
| 2006/0042483 A1 | 3/2006 | Work et al. |
| 2006/0069589 A1 | 3/2006 | Nigam |

(56) References Cited

U.S. PATENT DOCUMENTS

| | | |
|---|---|---|
| 2006/0112111 A1 | 5/2006 | Tseng |
| 2006/0184464 A1 | 8/2006 | Tseng |
| 2006/0200444 A1 | 9/2006 | Bracho et al. |
| 2006/0253316 A1 | 11/2006 | Blackshaw |
| 2006/0284873 A1 | 12/2006 | Forrest et al. |
| 2006/0287987 A1 | 12/2006 | McGeachie |
| 2006/0287989 A1 | 12/2006 | Glance |
| 2007/0033188 A1 | 2/2007 | Levy |
| 2007/0033189 A1 | 2/2007 | Levy |
| 2007/0100779 A1 | 5/2007 | Levy |
| 2007/0100875 A1 | 5/2007 | Chi |
| 2007/0106627 A1 | 5/2007 | Srivastava |
| 2007/0124208 A1 | 5/2007 | Schachter |
| 2007/0124432 A1 | 5/2007 | Holtzman |
| 2007/0150335 A1 | 6/2007 | Arnett |
| 2007/0208614 A1 | 9/2007 | Arnett |
| 2007/0214097 A1 | 9/2007 | Parsons et al. |
| 2007/0233656 A1 | 10/2007 | Bunescu et al. |
| 2007/0239452 A1 | 10/2007 | Madhavan et al. |
| 2008/0010270 A1 | 1/2008 | Gross |
| 2008/0033776 A1 | 2/2008 | Marchese |
| 2008/0077582 A1 | 3/2008 | Reed |
| 2008/0082399 A1 | 4/2008 | Noble et al. |
| 2008/0082586 A1 | 4/2008 | Jasik et al. |
| 2008/0147487 A1 | 6/2008 | Hirshberg |
| 2008/0154798 A1 | 6/2008 | Valz |
| 2008/0172606 A1 | 7/2008 | White |
| 2008/0189169 A1* | 8/2008 | Turpin et al. ............ 705/10 |
| 2008/0209320 A1 | 8/2008 | Mawhinney et al. |
| 2008/0228564 A1 | 9/2008 | de Heer et al. |
| 2008/0228695 A1 | 9/2008 | Sifry et al. |
| 2008/0288516 A1 | 11/2008 | Hadfield |
| 2009/0018996 A1 | 1/2009 | Hunt et al. |
| 2009/0043637 A1* | 2/2009 | Eder ............ 705/10 |
| 2009/0063408 A1* | 3/2009 | Bao et al. ............ 707/3 |
| 2009/0138427 A1 | 5/2009 | Kalavade |
| 2009/0204507 A1 | 8/2009 | Cockayne et al. |
| 2009/0222551 A1* | 9/2009 | Neely et al. ............ 709/224 |
| 2009/0222743 A1 | 9/2009 | Hadfield |
| 2009/0319518 A1 | 12/2009 | Koudas et al. |
| 2010/0063877 A1 | 3/2010 | Soroca et al. |
| 2010/0063959 A1 | 3/2010 | Doshi et al. |
| 2010/0070485 A1 | 3/2010 | Parsons et al. |
| 2010/0088234 A1 | 4/2010 | Moore et al. |
| 2010/0094878 A1 | 4/2010 | Soroca et al. |
| 2010/0125502 A1 | 5/2010 | Solomon et al. |
| 2010/0217757 A1 | 8/2010 | Fujioka |
| 2010/0241576 A1 | 9/2010 | Beeri |
| 2010/0274815 A1 | 10/2010 | Vanasco |
| 2011/0041153 A1 | 2/2011 | Simon et al. |
| 2011/0209067 A1 | 8/2011 | Bogess et al. |
| 2011/0246816 A1 | 10/2011 | Hsieh et al. |
| 2011/0258204 A1 | 10/2011 | Hubbard et al. |
| 2012/0296920 A1 | 11/2012 | Sahni et al. |

OTHER PUBLICATIONS

Wikipedia, Non-negative matrix factorization—published on-line at http://en.wikipedia.org/wiki/Non-negative_matrix_factorization, dated Nov. 9, 2008.
Toby Segaran, Programming Collective Intelligence, Published by O'Reilly, Aug. 2007.
Final Office Action for U.S. Appl. No. 12/356,429, mailed May 2, 2012.
Notice of Allowance for U.S. Appl. No. 12/819,402, mailed May 14, 2012.
Non-Final Office Action for U.S. Appl. No. 13/453,802, mailed Jun. 8, 2012.
U.S. Appl. No. 13/478,002, filed May 22, 2012.
United States Patent Office, Non-Final Office Action for U.S. Appl. No. 12/278,277 dated Sep. 14, 2012.
United States Patent Office, Non-Final Office Action for U.S. Appl. No. 13/074,809 dated Oct. 3, 2012.
USPTO, Final Office Action, for U.S. Appl. No. 13/074,809, mailed Feb. 14, 2013.
USPTO, Notice of Allowance, for U.S. Appl. No. 13/526,246, mailed Feb. 14, 2013.
USPTO, Notice of Allowance, for U.S. Appl. No. 12/356,429, mailed Feb. 15, 2013.
Canadian Intellectual Property Office, Examiner's Report for Canadian Patent Application No. 2,665,588, mailed Jul. 30, 2014.
Legal Terms of toyota.com, downloaded from http://www.toyota.com/help/legal.html on Jan. 9, 2012.
Landing page for toyota.com, downloaded from www.toyota.com on Jan. 9, 2012.
Definition of the term "search engine" by the Free Online Dictionary, downloaded from http://www.thefreedictionary.com/search+engine on Dec. 15, 2011.
English language Terms and Conditions for toyota.ca, downloaded from http://www.toyota.ca/cgi-bin/WebObjects/www.woa/wa/vp?vp=Home.Legal&language=english on Jan. 9, 2012.

* cited by examiner

METHOD AND SYSTEM FOR DETERMINING ON-LINE INFLUENCE IN SOCIAL MEDIA

RELATED APPLICATIONS

The present application is a Continuation-in-Part (CIP) of the U.S. application Ser. No. 12/174,345 filed Jul. 18, 2008 entitled "Method and System for Determining Topical On-Line Influence of an Entity", and claims benefit from the US provisional application to Christopher NEWTON Ser. No. 61/051,202 filed on May 7, 2008 entitled "Method and System for Determining On-Line Influence in Social Media", and the U.S. application Ser. No. 12/174,345 filed Jul. 18, 2008 entitled "Method and System For Determining Topical On-Line Influence of an Entity", both of which are incorporated herein by reference.

FIELD OF THE INVENTION

The present patent application relates to a computer implemented method and system for determining on-line influence in social media, and in particular, to a computer implemented method and system for determining on-line influence of a commentor, an individual, or a web-site.

BACKGROUND OF THE INVENTION

Determining on-line influence of a commentor, an individual, an entity, or a web-site, also to be referred herein as site, in social media becomes an increasingly important subject nowadays. A major problem facing marketers and public relation (PR) professionals revolves around the prolific use of social media sites and the awesome scale they have achieved. Literally, hundreds of thousands of videos, blog posts, podcasts, events, and social network interactions, such as wall posts, group postings, and others, occur daily. Due to the sheer volume of content, constantly changing landscape of popular sites, and hundreds of millions of users involved, it is impossible to determine who should be listened to and those who must be engaged.

Existing systems for determining influence in social media are site based, i.e. their models of influence are calculated on a per-site basis. If there is a one-to-one relationship between a site and a person (an author), then the influence is extrapolated to indicate the influence of the person for the medium, in which the site exists. For instance, if siteA is a blog with only one author, and all blogs are counted similarly, then the influence for siteA, as calculated by the prior art methods, would also indicate the influence for the author of the blog.

To the best of the knowledge of inventors, prior art methods predominantly calculate influence in social media by recursively analyzing inbound web page link counts. For example, siteA would have a higher influence score than siteB if the following approximate rules apply:

RULE 1: If the number of sites having links pointing at siteA is higher than the number of sites having links pointing at siteB; and RULE 2: If the count of sites pointing at the sites that point at siteA is higher than the count of sites that are pointing at the sites that point at siteB.

Rule 2 is applied recursively.

Various issues exist with this prior art method, namely:
  The method assumes that the total influence of the sites can be measured by a single property and that no other factors affect influence to a scale large enough to invalidate using only inbound link count as the measured property;
  The method assumes that the link graph representing all the links between the sites is complete enough to form a basis for determining an influence;
  The method assumes that a link implies that the linker has been influenced by the site he is linking to, which is not necessarily the case;
  The method does not account for connections someone may have with a site, if there is no link to track that connection, i.e. if a visitor does not own a blog, and therefore does not link out to anyone, but he is still a frequent visitor to the blog, e.g., http://www.autoblog.com, then the influence that Autoblog has over the visitor is not calculated; and
  The method does not map properly to other types of content and methods of social media expression, e.g., link-analysis methods deployed to the blogosphere are not relevant in the micromedia sphere of Twitter, i.e. link analysis techniques do not translate to all forms of social media and therefore they leave out entire pools of influencers that use other media channels as their voice.

Accordingly, there is a need in the industry for developing alternative and improved methods and system for determining on-line influence of individuals and commentors cited or published in social media content as well as for determining the influence of web-sites hosting the content.

SUMMARY OF THE INVENTION

There is an object of the invention to provide an improved method and system for determining topical on-line influence of a commentor, an individual, or a site, which would avoid or mitigate the above mentioned drawbacks of the prior art.

According to the embodiments of the invention, a topical on-line influence is introduced, which is a measure of how many people are engaged in a message of an entity content site around a given topic. Additionally the influence can also be a measure of the popularity level of a commentor, or an individual, or how influential they are around a given topic.

A user is allowed to manipulate equations by adding additional viral properties to the equations or removing certain viral properties from the equations, and by adjusting weights in the equations.

According to one aspect of the invention, there is provided a method for determining a topical on-line influence of a commentor, the method comprising:
  (a) matching and tagging content with a selected topic to generate tagged content;
  (b) extracting viral properties for the tagged content;
  (c) identifying a commentor from said tagged content; and
  (d) determining the topical on-line influence of said commentor; wherein said topical on-line influence of said commentor is characterized by a topical influence value of the commentor; and said topical influence value of the commentor is calculated from a commentor influence model based on the extracted viral properties.

Additionally, the commentor influence model is a linear combination of the extracted viral properties weighted with respective weights applied to each of the extracted viral properties.

Furthermore, step (d) of the method further comprises:
  determining topical influences of on-line outlets owned by said commentor said topical influences characterized by respective topical influence values of the on-line outlets; and creating an updated commentor influence model by forming a linear combination of the topical influence values of said on-line outlets and the topical influence value of the commentor.

Beneficially, each topical influence of the topical influences of the on-line outlets owned by said commentor is determined from a linear combination of viral properties extracted from a corresponding on-line outlet.

In one modification, the method further comprises:
(e) aggregating the viral properties of tagged content contained within a web-site and having a comment from said commentor to form aggregated viral properties of the tagged content within the web-site; and
(f) calculating a topical influence value of the web-site based on a linear combination of the aggregated viral properties of the tagged content within the web-site and the topical influence value of the commentor.

In a further modification, the method comprises:
(g) identifying an individual cited in the tagged content contained within the web-site;
(h) aggregating viral properties of the tagged content citing said individual to form aggregated viral properties of the tagged content citing said individual; and
(i) calculating an influence value of said individual based on a linear combination of the aggregated viral properties of the tagged content citing said individual.

In another modification, the method further comprises:
(j) updating the topical influence value of the web-site by calculating the topical influence value of the web-site based on a linear combination of the aggregated viral properties of the tagged content within the web-site, the topical influence value of the commentor and the influence value of said individual.

Step (i) further comprises:
(i) identifying an outlet owned by said individual;
(ii) calculating an influence value of said outlet owned by said individual based on a linear combination of viral properties extracted from said outlet owned by said individual; and
(iii) updating the influence value of said individual based on a linear combination of said aggregated viral properties of the tagged content citing said individual and the influence value of said outlet owned by said individual.

Step (b) of the method comprises:
collecting values of the viral properties at predetermined time intervals; and
storing the collected values in respective time series.

Furthermore, the viral properties are selected from the group consisting of:
user engagement value; average comment count; average unique commentor count;
cited individual count; inbound links; subscribers; average social bookmarks;
average social news votes; buries; total count of posts; and total count of appearance of Individuals names across all posts.

According to another aspect of the invention, a method for determining a topical on-line influence of a web-site is disclosed. The method comprises:
(a) matching and tagging content with a selected topic to form tagged content;
(b) extracting viral properties for the tagged content;
(c) aggregating the viral properties across all tagged content contained within the web-site; and
(d) calculating an influence value of the web-site based on a linear combination of the aggregated viral properties, said influence value characterizing the topical on-line influence of the web-site.

The method further comprises:
(e) identifying a commentor having a comment in said tagged content contained within the web-site;
(f) determining a topical influence of said commentor wherein said topical influence is characterized by an influence value of the commentor and said influence value of the commentor is calculated based on a linear combination of the aggregated viral properties of the tagged content contained within the web-site and having the comment from said commentor; and
(g) updating the topical on-line influence of the web-site by integrating the influence value of the commentor in the calculation of the influence value of the web-site.

Additionally, the method further comprises:
(h) identifying an individual cited in said tagged content contained within the web-site;
(i) determining a topical influence of said individual characterized by an influence value of the individual and said influence value of the individual is calculated based on a linear combination of the aggregated viral properties of the tagged content contained within the web-site and citing said individual; and
(j) updating the topical on-line influence of the web-site by integrating the influence value of the commentor and the influence value of the individual in the calculation of the influence value of the web-site.

The step of calculating the influence value of said commentor comprises:
(i) identifying an outlet owned by said commentor;
(ii) determining an influence of said outlet characterized by an influence value of said outlet; and
(iii) calculating the influence value of said commentor by including the influence value of said outlet in the linear combination of the aggregated viral properties of the tagged content contained within the web-site and having a comment from said commentor.

The step of calculating the influence value of said individual comprises:
(i) identifying an outlet owned by said individual;
(ii) determining an influence of said outlet characterized by an influence value of said outlet; and
(iii) calculating the influence value of said individual by including the influence value of said outlet in the linear combination of the aggregated viral properties of the tagged content contained within the web-site and citing said individual.

In one modification, the method further comprises iterating steps (a) to (d) for a plurality of web-sites and identifying top influential sites based on the influence value of each of the plurality of web-sites.

In another modification, the method further comprising iterating steps (e) to (g) for a plurality of commentors and identifying top influential commentors based on the influence value of each of the plurality of commentors.

In yet another modification, the method further comprises iterating steps (h) to (j) for a plurality of individuals and identifying top influential individuals based on the influence value of each of the plurality of individuals.

In yet another aspect of the invention, a computer readable medium is disclosed. The computer readable medium comprises a computer code instructions stored thereon, which, when executed by a computer, perform the steps of the methods of the present invention.

In a further aspect, a system for determining a topical on-line influence of a web-site is disclosed. The system comprises:

a processor; and a computer readable storage medium having computer readable instructions stored thereon for execution by the processor, forming the following modules:

(a) a matching module for matching and tagging content to a selected topic to generate tagged content;

(b) a viral properties extraction module for extracting viral properties of said tagged content;

(c) a commentor influence modeling module for calculating an influence value of a commentor based on viral properties extracted from tagged content having a comment from the commentor, said influence value of the commentor characterizing a topical influence of the commentor; and (d) a site influence modeling module for calculating an influence value of a web-site based on viral properties extracted from tagged content contained in said web-site, said influence value of the web-site characterizing a topical influence of the web-site.

The site influence modeling module further comprises a site influence updating module for updating the influence value of the web-site based on said viral properties extracted from the tagged content contained in said web-site, an influence value of a commentor having a comment in said tagged content and an influence value of an individual cited in said tagged content.

Additionally, the system further comprises:

an individual influence modeling module for calculating the influence value of the individual cited in said tagged content based on viral properties extracted from tagged content identifying said individual, said influence value of the individual characterizing a topical influence of the individual.

The commentor influence modeling module further comprises a commentor influence updating module for updating the influence of the commentor by calculating the influence value of the commentor based on viral properties extracted from the tagged content having a comment from the commentor and influence values of outlets owned by said commentor.

The individual influence modeling module further comprises an individual influence updating module for updating the topical influence of the individual by calculating the influence value of the individual based on viral properties extracted from tagged content identifying said individual and influence values of outlets owned by said individual.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

Embodiments of the invention describe models for determining an influence of a commentor, an individual, a web-site, or site, wherein the model for determining the influence of the site uses, recursively, an influence value for a commentor or an influence value for an individual, or both, when the commentor or individual is present in the site. The influence values for the commentor and individual characterize, respectively, the influence of the commentor and individual. The influences are topically relevant, and can be aggregated across various forms of content. The influence of the commentor is calculated from an influence model for the commentor which is based on aggregated viral properties across content having comments from the commentor. The viral properties will be also referred to as herein as viral dynamics. Additionally, viral properties of social media outlets owned by the commentor, when available, are integrated into the influence model for the commentor. The influence of the individual is calculated from an influence model for the individual, which is based on aggregated viral properties of the content citing the individual. The influence model for the site hosting the topically-relevant content is based on the extracted viral properties of the content. Further fine-tuning of the influence model for the site is provided by selectively integrating the influence value for the commentors and influence value for the individuals.

Figure 1:
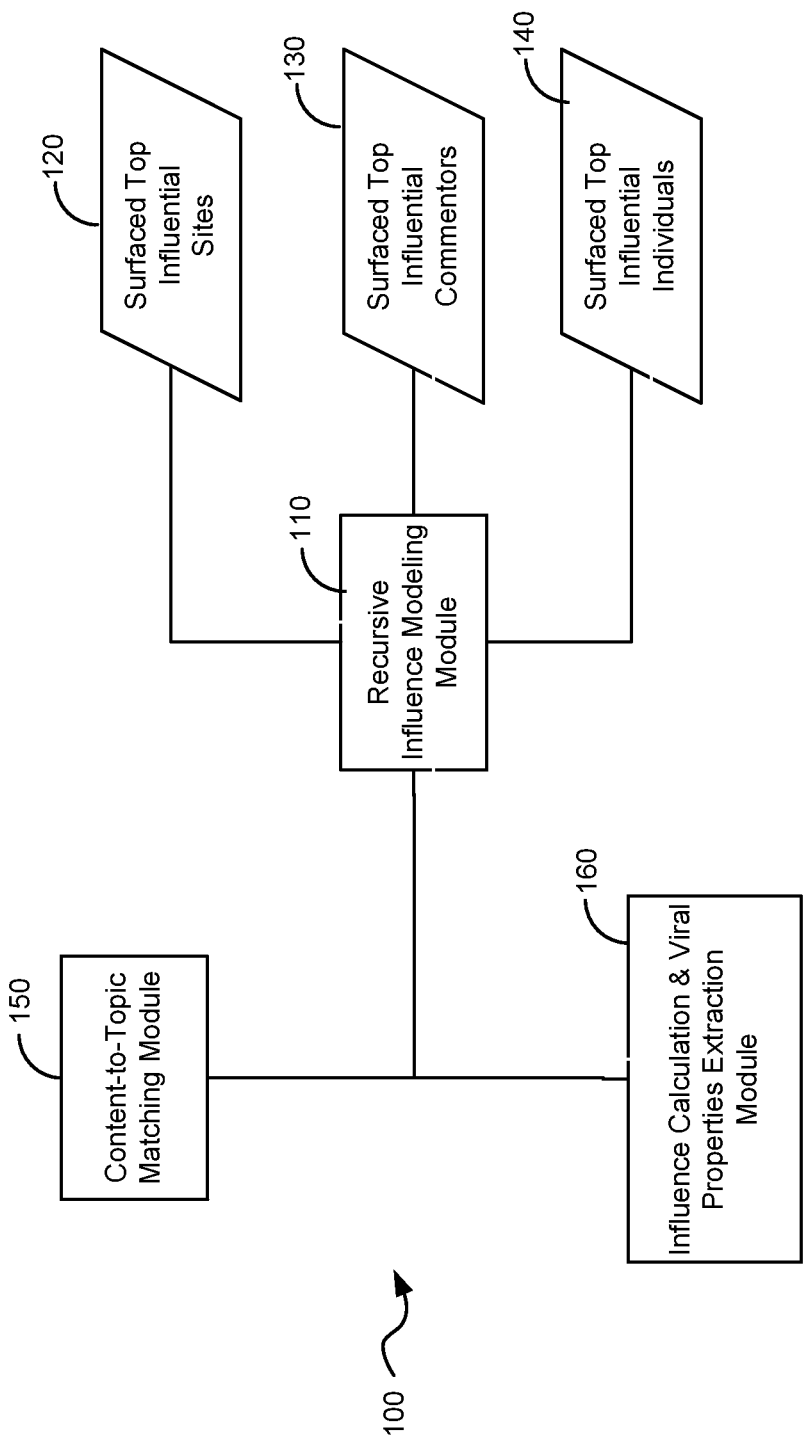
FIG. 1 illustrates a system architecture, in which the embodiments of the present invention have been implemented.

FIG. 1 illustrates architecture of a system 100, in which the embodiments of the present invention have been implemented. The system 100 includes a Content-to-Topic Matching Module 150, an Influence Calculation & Viral Properties Extraction Module 160 and a Recursive Influence Modeling Module 110. The system 100 includes also Surfaced Top Influential Sites data store 120, Surfaced Top Influential Commentors data store 130 and Surfaced Top Influential Individuals data store 140.

As shown in FIG. 1, the Recursive Influence Modeling Module 110 is connected to the Content-to-Topic Matching Module 150. The Recursive Influence Modeling Module 110 is also connected to the Influence Calculation & Viral Properties Extraction Module 160 and to the data stores 120, 130 and 140. The Recursive Influence Modeling Module 110 processes information received from the Content-to-Topic Matching Module 150 and the Influence Calculation & Viral Properties Extraction Module 160, and generates, as output, data related to top influencers.

Surfaced Top Influential Sites data store 120, Surfaced Top Influential Commentors data store 130 and Surfaced Top Influential Individuals data store 140 contain, respectively, top influential sites, top influential commentors and top influential individuals. The data in the data stores 120, 130 and 140 is generated from the Recursive Influence Modeling Module 110. The data stores 120, 130 and 140 are implemented as databases stored in a computer readable storage medium, e.g., computer memory, DVD, CD-ROM, accessible through a database query language. Other alternative implementations can also be adopted to store and retrieve the stored data.

The system illustrated in FIG. 1 comprises a computer, having a processor and a computer readable storage medium having computer readable instructions stored thereon for execution by the processor, and forming modules of the system of FIG. 1 described above. The computer readable storage medium can be implemented as a computer memory, CD-ROM, DVD, floppy, hard drive or the like. The modules of the system of FIG. 1, when executed by the computer, perform the steps of the method of the embodiment of the present invention.

As an example, each of the individual modules of the system 100 can be implemented as an individual software module or agent running on a common hardware platform. Other alternative implementations are possible and are well known to the persons skilled in the art.

The Content-to-Topic Matching Module 150 of the system 100 matches accessed content to user-defined topics to produce tagged content. The architecture and operation of this module will be described with reference to FIGS. 2 and 3 below.

The Influence Calculation & Viral Properties Extraction Module 160 extracts viral properties from the tagged content and computes influence values based on user-defined influence weights. This module will be later described with reference to FIGS. 4 and 5. The viral properties or viral dynamics, and the tagged content are processed by the Recursive Influence Modeling Module 110 to generate a list of top influencers.

Figure 2:
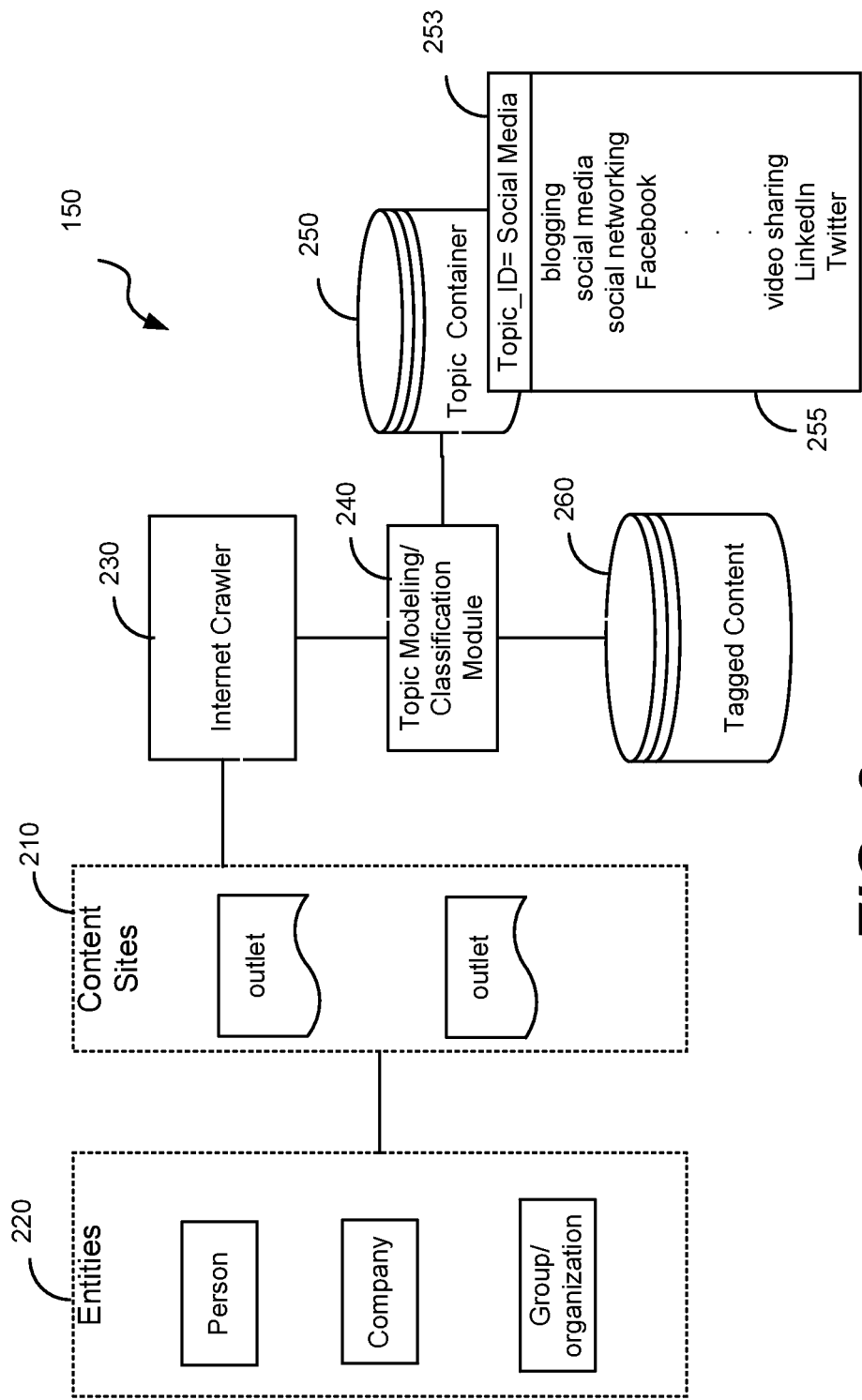
FIG. 2 illustrates a Content-to-Topic Matching block 150 of the system of FIG. 1.

FIG. 2 shows a block diagram of the Content-to-Topic Matching Module 150 of the system 100. The diagram 150 shows entities 220 such as an Individual (Person), a Company or a named group or organization, which may have one or more outlets where they publish the content. A content site 210 is defined as a site hosting one or more outlets, through which an entity or commentor regularly publishes some form of content or comment. The content site 210 is accessible to an Internet Crawler 230, which is connected to a Topic Modeling/Classification Module 240. The Topic Modeling/Classification Module 240 is also connected to a Topic Container 250 from which it receives topic-related information. The Topic Modeling/Classification Module 240 processes the topic-related information and the content retrieved by the Internet Crawler 230 to match the content to a defined topic. The matched content is then stored in a tagged content database 260.

The Topic Container 250 is a collection of words, phrases, along with the necessary Boolean logic, which describes a subset of various social media content, usually centered around a brand, name, field of study, market, concept, or product. FIG. 2 shows an exemplary content of the Topic Container 250 presented as a table identifying a topic profile defined by a Topic_ID 253 and a collection of keywords and Boolean operators 255 describing the Topic_ID 253. In this exemplary table, the topic is identified as "Social media" and the keywords defining the topic include, but are not limited to, 'blogging', 'social media', 'social networking', twitter, Facebook, LinkedIn, 'video sharing', etc., which describe the topic "Social Media", as listed in the keywords and Boolean operators 255.

The Topic Modeling/Classification Module 240 defines a topic model, which is a trained text classification model, created by feeding a text classifier, a labeled corpus of on-topic and not on-topic content. The classifier then gauges unlabelled data based on how closely it matches the trained topic model. Text or content classification methods are well known to those skilled in the art, and any suitable classification model can be used to classify and tag the content.

Figure 3:
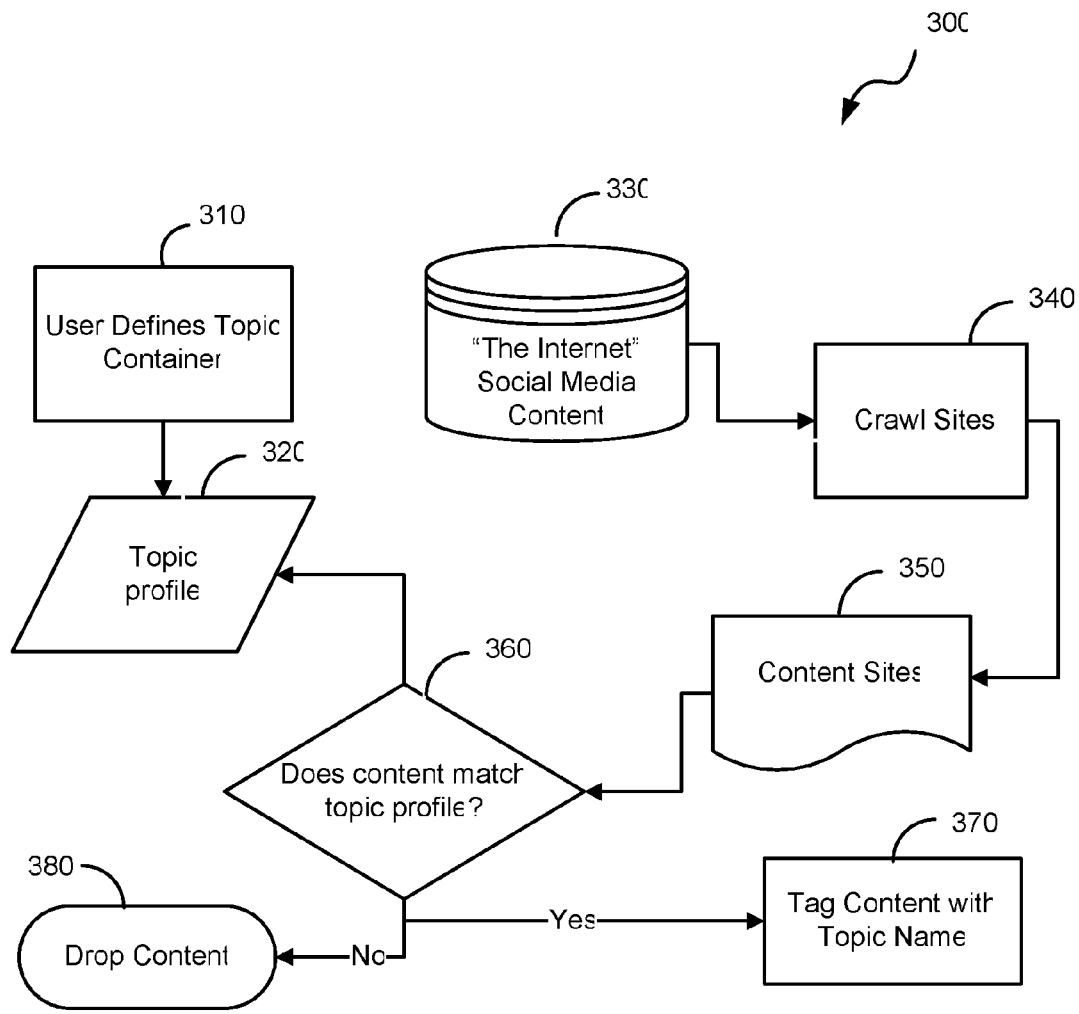
FIG. 3 shows a flowchart 300 illustrating the operation of the Content-to-Topic Matching block of FIG. 2.

The operation of the Content-to-Topic Matching Module 150 will now be described in more detail with reference to a flow chart 300 shown in FIG. 3. At step 310, a user defines a topic container encapsulating a topic profile 320 against which the retrieved content needs to be matched. The topic profile 320 is defined by the set of keywords and Boolean operators 255 and the Topic_ID 253 as shown in FIG. 2.

At step 340, social media content sites 330 are identified by crawling the Internet, followed by presenting the discovered content sites 350 to an analysis phase. All discovered social media content sites 350 are passed through the analysis phase at step 360, where the content is matched against the topic profile 320. If the content does not match the topic profile 320 (exit "No" from step 360), it is disregarded in step 380. If a match is found (exit "Yes" from step 360), the content is then tagged with the corresponding topic in step 370.

Figure 4:
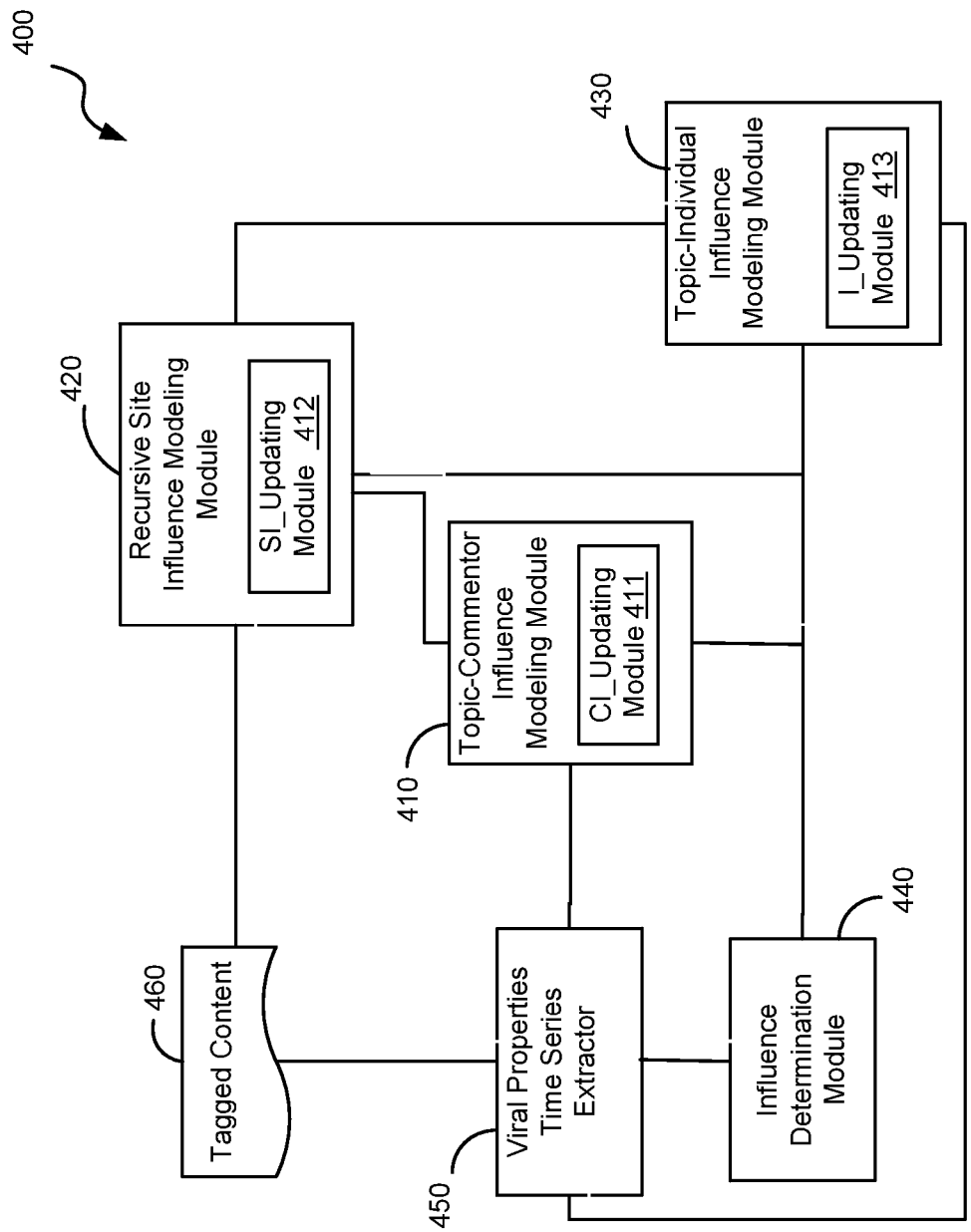
FIG. 4 shows a block diagram for a system for a recursive determining of influence of a commentor, individual, or a site according to the embodiment of the invention.

FIG. 4 shows a block diagram 400 for the system for recursively determining the influence of a commentor, an individual, or a site according to the embodiment of the invention. A set of Tagged Content 460 is provided in connection with a Viral Properties Time Series Extractor 450. Each piece of content from the set of tagged content 460, as described above, is a content that matches the selected topic profile 320 and is contained or hosted by a content site. Each piece of content is part of an entity's outlet such as blog, twitter, streaming video channel, micromedia or social networking outlet, etc.

The Viral Properties Time Series Extractor 450 extracts the viral properties related to the set of tagged content 460 and stores them in time series so that the history of each viral property is recorded. Viral properties or viral dynamics are defined as the various social media popularity metrics. Examples of viral properties include, but are not limited to:

User engagement across topically relevant posts, wherein the engagement is measured by the length of the commenting threads and the number of unique commentors;
    Average Comment count across topically relevant posts;
    Average unique commentor count across topically relevant posts;
    Cited individual count,
    Inbound links across topically relevant posts;
    Blog subscribers across all posts;
    Average Social bookmarks across all topically relevant posts;
    Average Social news votes and buries across all topically relevant posts;
    Total Count of topically relevant posts; and
    Total Count of appearance of Individuals names across all posts.

Other viral properties include breadth of reply, views, bookmarks, votes, buries, favorites, awards, acceleration, momentum, subscription counts, replies, spoofs, ratings, friends, followers, posts, and updates.

An Influence Determination Module 440 is connected to the Viral Properties Time Series Extractor 450 for determining the influence of each piece of content of the set of tagged content 460. In Determining the influence of a piece of content, the Influence Determination Module 440 receives user-defined influence weights for each collected viral properties and applies a mathematical model such as a linear combination model involving both the weights and the viral properties.

The Influence Determination Module 440, in this embodiment is also responsible for the determination of the influence of an outlet as described in the co-pending U.S. application Ser. No. 12/174,345 filed Jul. 18, 2008 entitled "Method And System For Determining Topical On-Line Influence Of An Entity" cited above.

A Topic-Commentor Influence Modeling Module 410 receives information related to the names of Unique Commentors and links from the Viral Properties Time Series Extractor 450 extracted from the tagged content 460. The links relate to hypertext or other web links that point back to the outlets such as blog, twitter or macromedia owned by the unique Commentors. The module 410 creates a topic-commentor influence model based on the viral properties across all content where the commentor has a comment, and determines the topical influence of the commentor characterized by an influence value of the commentor.

The module 410 includes also an update module (Cl_Updating Module 411) for updating the commentor influence value. When the commentor has his own outlet, the Cl_Updating Module 411 updates the influence value of the commentor based on an influence value of the outlets owned by the commentor and calculated by the Influence Determination Module 440.

A Recursive Site Influence Modeling module 420 is provided to process the set of tagged-content 460 and identify sites hosting the set of tagged content 460. The module 420 determines the influence of a site, characterized by a site influence value, from a linear combination model based on the content influences generated by the Influence Determination Module 440 by summing the content influences across all topically relevant content hosted by the site. Alternatively, the site influence can be computed by aggregating the extracted viral properties across all topically relevant content hosted by the site. The aggregation of extracted viral properties relates to the summing of all individual extracted viral properties. For example, if Content_1 has two types of viral properties with the following values: VP_C1_1 and VP_C1_2; and Content_2 has the same two types of viral properties with the following values: VP_C2_1 and VP_C2_2; then the aggregated viral properties would be: (VP_C1_1+VP_C2_1) and (VP_C1_2+VP_C2_2).

The Recursive Site Influence Modeling module 420 includes a SI_Updating module 412 for recursively fine-tuning the site influence model by including the influence value of the commentor from the topic-commentor influence model as well as an influence value for an individual calculated from a topic-individual influence model. In this fine-tuning operation, the site-influence model uses the influence of commentors commenting on the site and the influence of individuals named on the site to recursively update the model and determine the site influence. This process will be described hereinafter with reference to FIG. 5.

A Topic-Individual Influence Modeling Module 430 identifies individuals named in the content and creates the topic-individual influence model based on an aggregation of viral dynamics of content citing the individual. The Topic-Individual Influence Modeling Module 430 further includes an l_Updating module 413 for updating the influence of the individual characterized by the influence value of the individual using respective influence values of the outlets owned by the individual, when available. The operation of the Topic-Individual Influence Modeling Module 430 will be described in more details in reference to FIG. 5.

Figure 5:
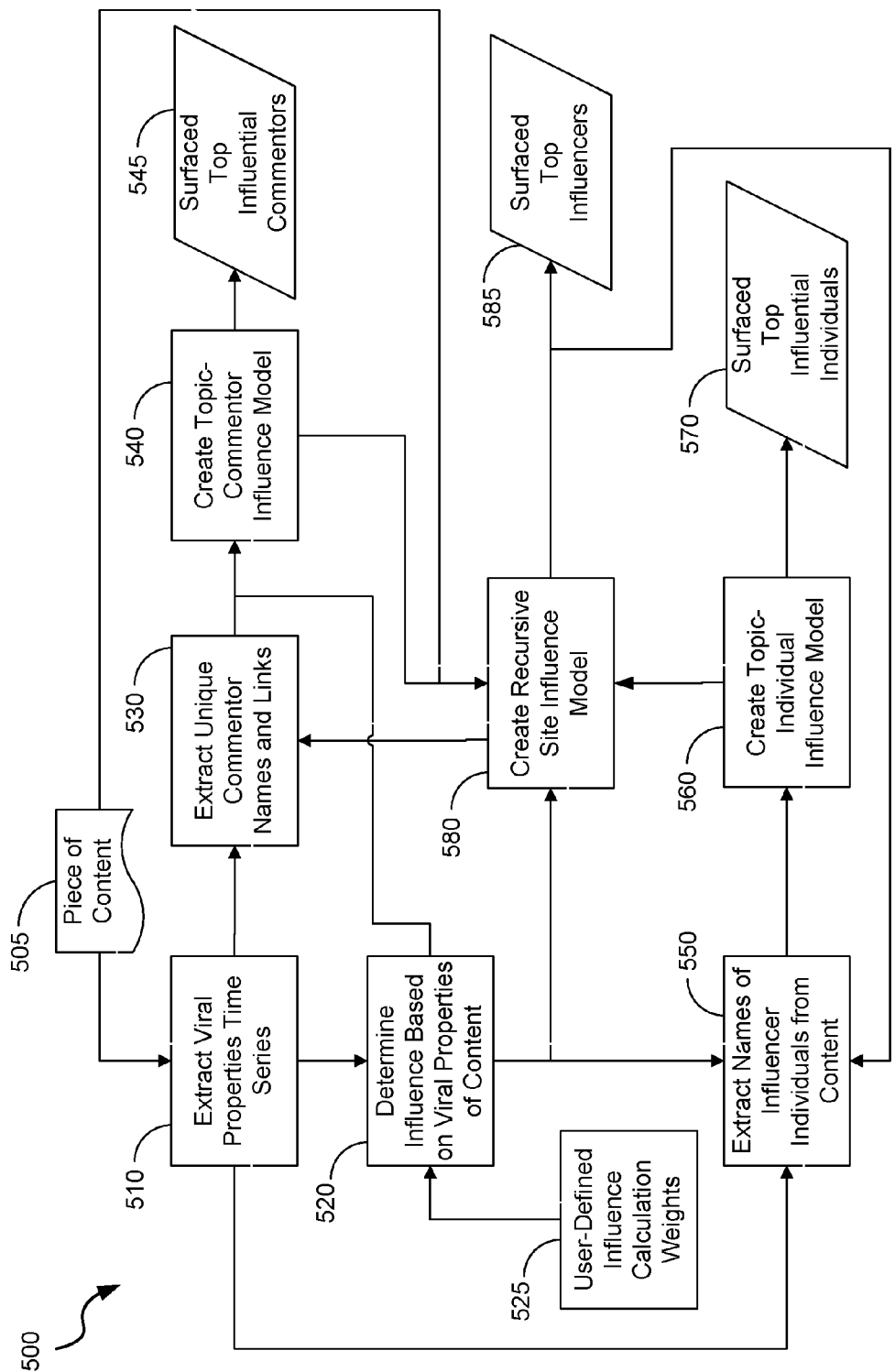
FIG. 5 shows a flowchart illustrating the operation of the system of FIG. 4.

FIG. 5 shows a flowchart 500 illustrating the operation of the system 400 of FIG. 4.

In the embodiment of the invention, each piece of content 505 that matches the topic profile 320 is scheduled to have its viral properties extracted at step 510 on a regular schedule, and stored in time series so that the history of each viral property is recorded. The time schedule used for extracting the viral properties changes as the recorded viral property values are analyzed. For instance, if upon checking the viral properties for a blog post on a 3 hour schedule, it is determined that the number of new comments has exploded, then, the schedule will be altered to ensure that the viral properties are checked more frequently. Conversely, if the comment count has changed little or not at all, the schedule may be changed to half the frequency, down to every 6 hours. Conveniently, different viral properties may have same or different time extraction schedule.

The extracted viral properties are used at "Determine Influence Based on Viral Properties of Content", step 520, to determine the influence of each piece of content 505 based on the collected viral properties. At step 520, the influence values of outlets are also calculated as disclosed in the above-mentioned patent application cited above.

As an example, the influence value for the piece of content 505 can be calculated according to a linear combination model of the viral properties weighted with respective weights applied to each of the viral properties:

$$CalculatedContentInfluence = (Weight1 * VP1) + (Weight2 * VP2) + (Weight3 * VP3) + (Weight4 * VP4) + (Weight5 * VP5) + (Weight6 * VP6) + \ldots + (Weightn * VPn),$$

where Weight1-Weightn are respective weight factors defining the relevant contribution of various viral properties (VP1-VPn) into the topical on-line influence for this content, and the topical on-line influence is represented by a value conveniently normalized to a scale of 0-100.

In the embodiment of the present invention, a user is responsible for adjusting the weights (i.e. Weight1-Weightn) for various viral properties used in the model above to reflect the viral properties which, in user's opinion, are most suitable for the business goals the user or his clients have set forth. The weight for each type of the outlet is also user defined and is entered at "User-Defined Influence Calculation Weights" step 525.

It is assumed that same default weights can be applicable to an average user. The weights adjusted by a user are saved on a per topic basis, allowing for a different topic to have a different weighting system to align with potentially different business goals.

At "Extract Unique Commentor Names and Links", step 530, names of commentors commenting on the piece of content 505 are extracted along with any link back to the outlets owned by the commentor. As an example, Robert Scobble may be a commentor on the piece of content 505, and he may also be providing links to his own outlets such as blog, twitter site, Facebook profile, and streaming video channel (Kyte.tv/ RobertScobble).

At step 540, the Commentor Influence model is created from the aggregation of the viral properties across all content having a comment from the selected commentor.

The influence value computed from Commentor Influence model, termed herein as Commentor_AggregatedViralsInfluence, is calculated according to a linear combination model of the extracted viral properties weighted with respective weights applied to each of the extracted viral properties as shown in the following model:

$$Commentor\_AggregatedViralsInfluence = (Weight\_11 * AVP1) + (Weight\_22 * AVP2) + (Weight\_33 * AVP3) + \ldots (Weight\_nn * AVPn),$$

where Weight_11-Weight_nn are respective weight factors defining relevant contribution of various viral properties into the modeling of the Commentor_AggregatedViralsInfluence, and where AVP1-AVPn are respective Aggregated Viral Properties extracted across all pieces of content 505 containing a comment from the selected commentor, namely Robert Scobble in this example.

The Commentor Influence model, according to the embodiment of the present invention, is further updated by the CI_Updating Module 411 based on the influence values of all outlets owned by the commentor Robert Scobble.

Considering that the commentor, Robert Scobble, has his own outlets, namely a blog, video channel, MicroMedia channel, social network and social news page and image sharing page, The Commentor Influence model can then be updated according to a linear combination model of the topical influence values of the outlets owned by Robert Scobble and the topical influence value of the commentor calculated above as Commentor_AggregatedViralsInfluence as shown in the following model:

CommentorInfluence=
((Weight000*Commentor_AggregatedViralsInfluence)+
(Weight111*Commentor_CalculatedBlogInfluence)+
(Weight222*Commentor_CalculatedVideoChannelInfluence)+
(Weight333*Commentor_CalculatedMicroMediaInfluence)+
(Weight444*Commentor_CalculatedSocialNewsInfluence)+
(Weight555*Commentor_CalculatedSocialNetworkInfluence)+
(Weight666*Commentor_CaculatedImageSharingInfluence))/7.

where Weight111-Weight666 are respective weight factors assigned to the various forms of outlets, Weight000 is the weight factor for the Commentor_AggregatedViralsInfluence value into the final Commentor influence value, and where
Commentor_CalculatedBlogInfluence,
Commentor_CalculatedVideoChannelInfluence,
Commentor_CalculatedMicroMediaInfluence,
Commentor_CalculatedSocialNewsInfluence,
Commentor_CalculatedSocialNetworkInfluence, and
Commentor_CaculatedImageSharingInfluence
are respective influence values of the various outlets owned by Robert Scobble calculated at step 520 as disclosed in the above-mentioned patent application incorporated herein by reference.

An influence value characterizing the Commentor_CalculatedBlogInfluence can be calculated using a linear combination model as follows:

Commentor_CalculatedBlogInfluence=
(Weight1*BlogEngagement)+(Weight2*Average
comment Count)+(Weight3*Average Unique
Commentor Count)+(Weight4*Inbound Links)+
(Weight5*Blog Subscribers)+
(Weight6*Bookmarks)+(Weight7*Votes)+
(Weight8*Count of Topically relevant posts), where Weight1-Weight8 are respective weight factors defining the relevant contribution of various viral properties into the topical on-line influence for Robert Scobble blog.

Likewise the influence value characterizing the Commentor_CalculatedVideoChannelInfluence can be calculated as follows:

Commentor_CalculatedVideoChannelInfluence=
(Weight11*Average Concurrent Viewership)+
(Weight12*Total Views)+(Weight13*Inbound
Links)+(Weight14*Engagement)+
(Weight15*Average Comment Count)+
(Weight16*Unique Commentor Count)+
(Weight17*Count of Topically Relevant Posts)

where Weight11-Weight17 are respective weight factors defining the relevant contribution of various viral properties into the topical on-line influence of this video channel outlet.

Using the linear combination models above, the influence value characterizing the topical on-line influence of all the outlets can be calculated by taking into account specific viral properties that are measurable in the selected outlet.

As each viral property value is stored in time series, the topical on-line influence of all commentors can be determined for any time or time periods, and top influential commentors can be identified or surfaced at step 545.

In one embodiment of the invention, topical on-line influences for individuals are also determined. As shown in the flowchart 500, at step 550, names of individuals cited in all pieces of content 505 are extracted, and their viral properties are aggregated around each individual to create a topic-Individual influence model (step 560). As an example, an individual named Cesc may be cited in one or more pieces of content 505. In this example, the topical on-line influence of Cesc can be determined by calculating the influence value of the individual, (i.e. Cesc) based on a linear combination model. The model can be based on aggregated viral dynamics of all the content where Cesc is cited, and applying user-defined weights to the aggregated viral dynamics, as follows:

Individual_AggregatedViralsInfluence=
(Weight_01*AVD_01)+(Weight_02*
AVD_02)+(Weight_03*AVD-03)+ . . .
(Weight_0n*AVD_0n)

where Weight_01-Weight_0n are respective weight factors defining relevant contribution of various viral dynamics into the influence of the individual, and where AVD_01-AVD_0n are respective Aggregated Viral Dynamics extracted across all pieces of content 505 mentioning the selected individual (i.e. Cesc).

Furthermore, for individuals who have their own social media outlet such as blog, video channel or other social media page, the topic-individual influence model can integrate the influence of those outlets using the L_Updating module 413 of the Topic-Individual Influence Modeling Module 430 according to the following linear combination model:

IndividualInfluence=((Weight_000*Individual_
AggregatedViralsInfluence)+(Weight_111*Indi-
vidual_CalculatedBlogInfluence)+(Weight_
222*Individual_CalculatedVid-
eoChannelInfluence)+(Weight_
333*Individual_CalculatedMicroMediaInfluence)+
(Weight_444*Individual_CalculatedSocial-
NewsInfluence)+(Weight_555*Individual_Cal-
culatedSocialNetworkInfluence)+(Weight_
666*Individual_CaculatedImageSharingInfluence))/7.

where Weight_111-Weight_666 are respective weight factors defining relevant contribution of various forms of outlets, and Weight_000 is the weight factor for the Individual_AggregatedViralsInfluence value into the final Individual influence value.

Using this method, all individuals can be assigned an associated influence value, followed by identifying top individual influencers at step 570.

At step 580, a site influence model referred also as topic-site influence model is recursively created for each content site hosting one or more content matching the selected topic profile based on the aggregation of the viral properties for all pieces of content 505 within each site and an influence weight (Site_type_weight) according to the type of outlet hosted by the site (e.g. blog, twitter, social media site, etc). When a content site includes content, in which an influential commentor is present, the SI_updating module 412 fine-tunes the site influence model by recursively applying the influence value of the commentor in the site influence model. In this embodiment, the influence value of the commentor is added to the site influence model in a weighted manner. The influence value of a site named S1 is calculated according to the following linear combination model:

CalculatedSiteInfluence_S1=Site_type_weight*
(W0*S1_AVP0+ . . . Wn*S1_AVPn)+
(CW0*CommentorInfluence_0+ . . .
CWk*CommentorInfluence_k)

where Site_type_weight is the weight defined for the type of site (blog site, video channel provider site, twitter type of site, etc); W0 ... Wn are respective weights for the aggregate viral properties S1_AVP0 ... S1_AVPn collected on all content of the site S1, and CW0 ... CWk are respective weights applied to the influence values of the commentors CommentorInfluence_0 ... CWn*CommentorInfluence_k. The weights CWi as well as the number of commentors can be user-defined and set according to business objectives, or a threshold of influence. Other criteria for setting these values can as well be adopted.

The above noted model is exemplary, it is contemplated that other models can as well be used to determine the influence value of a site.

According to another embodiment, one or more top individual influencers can be included in the site influence model described with reference to step 580. Thus, a modified model for calculating the influence value of the site becomes as follows:

$$\begin{aligned}CalculatedSiteInfluence\_S1 = &Site\_type\_weight^* \\ &(W0^*S1\_AVP0+ \ldots Wn^*S1\_AVPn)+ \\ &(CW0^*CommentorInfluence\_0+ \ldots \\ &CWk^*CommentorInfluence\_k)+ \\ &(IW0^*IndividualInfluence\_0+ \ldots \\ &IWI^*IndividualInfluence\_I)\end{aligned}$$

where $IW0 \ldots IWI$ are respective weights applied to the influence values of individuals Individual Influence_ ... Individual Influence_I.

By iterating the determination of the site influence characterized by the site influence value across all sites having content that matches the topic container, top Site Influencers can be identified (step 585).

The embodiments of the present invention provide numerous advantages, most importantly, to public relation professionals to make preemptive marketing decisions that are not available today. Within a selected topic, the present invention allows marketers to compare two different sites, each hosting a set of outlets, and determine which one has the most topical on-line influence, and therefore has more potential to induce a successful advertising campaign.

As mentioned above, the system of the present invention have been implemented as a general purpose or specialized computer having a CPU and a memory storing computer code instructions to be performed by the CPU, which form the modules of the system perform as shown in FIGS. 1 and 4 described above, and, when executed, perform the steps of the method described above.

A computer readable medium is also provided, e.g., CD-ROM, DVD, flash memory, floppy or the like, wherein the computer code instructions are stored, for executing by a computer to perform the steps of the method described above.

Thus, improved methods and system for determining topical on-line influence of a site, commentor, and an individual have been provided.

What is claimed is:

1. A computer-implemented method performed by a computer for determining a topical influence value of a commentor, an influence value of an individual and a topical influence value of a web-site, wherein the computer is in communication with a server via network to access a web-site hosted by the server, the computer-implemented method comprising steps of:
    matching and tagging content within the web-site with a selected topic, using a processor of the computer, to generate tagged content;
    extracting, with the processor, viral properties for the tagged content;
    identifying, with the processor, a commentor from said tagged content and an individual cited in the tagged content contained within the web-site;
    aggregating, with the processor, the viral properties for the tagged content from said web-site to form aggregated viral properties of the tagged content from said web-site, the viral properties of the tagged content from said commentor to form aggregated viral properties of the tagged content from said commentor, and the viral properties of the tagged content citing said individual to form aggregated viral properties of the tagged content citing said individual;
    computing with the processor:
        the topical influence value of said commentor based on a linear combination of the aggregated viral properties of the tagged content from said commentor weighted with respective weights applied to each of the aggregated viral properties of the tagged content from said commentor;
        the influence value of said individual based on a linear combination of the aggregated viral properties of the tagged content citing said individual; and
        the topical influence value of the web-site based on a linear combination of the aggregated viral properties of the tagged content from said web-site, the topical influence value of the commentor, and the influence value of said individual cited in the tagged content.

2. The method of claim 1, wherein the step of computing, with the processor: the topical influence value of said commentor further comprises:
    determining topical influences of on-line outlets owned by said commentor, said topical influences characterized by respective topical influence values of the on-line outlets; and
    creating an updated commentor influence model by forming a linear combination of the topical influence values of said on-line outlets and the topical influence value of the commentor.

3. The method of claim 2, wherein each topical influence of the topical influences of the on-line outlets owned by said commentor is determined from a linear combination of viral properties extracted from a corresponding on-line outlet.

4. The method of claim 1, further comprising:
    repeating the steps of matching and tagging, extracting, identifying, aggregating and computing, the repeating of the computing step including:
        updating the topical influence value of said commentor to generate an updated topical influence value of said commentor;
        updating the influence value of said individual to generate an updated influence value of said individual; and
        updating the topical influence value of the web-site to generate an updated topical influence value of the web-site by integrating the updated topical influence value of the commentor and the updated influence value of said individual in the computation of the updated topical influence value of the web-site.

5. The method of claim 1, wherein the step of computing the influence value of said individual, further comprises:
    identifying an outlet owned by said individual;
    calculating an influence value of said outlet owned by said individual based on a linear combination of viral properties extracted from said outlet owned by said individual; and
    updating the influence value of said individual based on a linear combination of said aggregated viral properties of the tagged content citing said individual and the influence value of said outlet owned by said individual.

6. The method as described in claim 1, wherein the step of extracting viral properties for the tagged content comprises:
   collecting values of the viral properties at predetermined time intervals; and
   storing the collected values in respective time series.

7. The method of claim 1 wherein said viral properties are selected from the group consisting of:
   User engagement value;
   average Comment count;
   average unique commentor count;
   cited individual count,
   inbound links;
   subscribers;
   average Social bookmarks;
   average Social news votes;
   buries;
   total count of posts; and
   total count of appearance of Individuals names across all posts.

8. A method performed by a computer for determining a topical influence value of a commentor, an influence value of an individual, and a topical influence value of a web-site, wherein the computer is in communication with a server via network to access a web-site hosted by the server, the method comprising the steps of:
   matching and tagging content within the web-site with a selected topic, using a processor of the computer, to form tagged content;
   extracting, with the processor, viral properties for the tagged content;
   identifying from said tagged content, with the processor, a commentor having a comment in said tagged content contained within the web-site and an individual cited in the tagged content contained within the web-site;
   aggregating, with the processor, the viral properties for the tagged content from said web-site to form aggregated viral properties of the tagged content from said web-site, the viral properties across all tagged content contained within the web-site including viral properties of the tagged content from said commentor to form aggregated viral properties of the tagged content having the comment from said commentor, and the viral properties of the tagged content citing said individual to form aggregated viral properties of the tagged content citing said individual;
   computing, with the processor:
      the topical influence value of said commentor using a commentor influence model that is based on a linear combination of the aggregated viral properties of the tagged content having the comment from said commentor, the aggregated viral properties weighted with respective weights applied to each of the aggregated viral properties of the tagged content from said commentor;
      the influence value of said individual based on a linear combination of the aggregated viral properties of the tagged content contained within the web-site and citing said individual; and
      the topical influence value of the web-site based on a linear combination of the aggregated viral properties of the tagged content from said web-site, the topical influence value of the commentor and the influence value of said individual cited in the tagged content contained within the web-site, said topical influence value of the web-site characterizing the topical on-line influence of the web-site;
   repeating the steps of matching and tagging, extracting, identifying, aggregating and computing, the repeating of the computing step including: updating the topical influence value of said commentor using the commentor influence model to generate an updated topical influence value of said commentor; updating the influence value of said individual to generate an updated influence value of said individual; and updating the topical influence value of the web-site to generate an updated topical influence value of the web-site by integrating the updated topical influence value of the commentor and the updated influence value of said individual in the computation of the updated topical influence value of the web-site.

9. The method of claim 8, wherein the step of computing the topical influence value of said commentor comprises:
   identifying an outlet owned by said commentor;
   determining an influence of said outlet characterized by an influence value of said outlet; and
   calculating the influence value of said commentor by including the influence value of said outlet in the linear combination of the aggregated viral properties of the tagged content contained within the web-site and having a comment from said commentor.

10. The method of claim 8, wherein the step of computing the influence value of said individual comprises:
    identifying an outlet owned by said individual;
    determining an influence of said outlet characterized by an influence value of said outlet; and
    calculating the influence value of said individual by including the influence value of said outlet in the linear combination of the aggregated viral properties of the tagged content contained within the web-site and citing said individual.

11. The method of claim 8, further comprising:
    iterating the steps of matching and tagging, extracting, identifying, aggregating and computing for a plurality of web-sites; and
    identifying top influential sites based on the topical influence values for each of the plurality of web-sites.

12. The method of claim 8, further comprising:
    iterating the steps of matching and tagging, extracting, identifying, aggregating and computing for a plurality of commenters; and
    identifying top influential commentors based on the topical influence values for each of the plurality of commentors.

13. The method of claim 8, further comprising:
    iterating the steps of matching and tagging, extracting, identifying, aggregating and computing for a plurality of individuals; and
    identifying top influential individuals based on the influence values for each of the plurality of individuals.

14. A non-transitory computer readable medium, comprising computer code instructions stored thereon, which, when executed by a computer coupled to a network and in communication with a server via the network to access a web-site hosted by the server, cause the computer to perform the steps of:
    matching and tagging content within a web-site with a selected topic to form tagged content;
    extracting viral properties for the tagged content;
    identifying a commentor from said tagged content and an individual cited in the tagged content contained within the web-site;

aggregating the viral properties for the tagged content from said web-site to form aggregated viral properties of the tagged content from said web-site, aggregating the viral properties of the tagged content having a comment from said commentor to form aggregated viral properties of the tagged content from said commentor, and aggregating the viral properties of the tagged content citing said individual to form aggregated viral properties of the tagged content citing said individual;

computing a topical influence value of said commentor based on a linear combination of the aggregated viral properties of the tagged content from said commentor weighted with respective weights applied to each of the aggregated viral properties;

computing an influence value of said individual based on a linear combination of the aggregated viral properties of the tagged content citing said individual; and computing a topical influence value of the web-site based on a linear combination of the aggregated viral properties of the tagged content from said web-site, the topical influence value of the commentor and the influence value of said individual cited in the tagged content contained within the web-site.

15. A system for determining a topical influence of a web-site, comprising:
   a network;
   a server coupled to the network, wherein the server hosts the web-site;
   a computer coupled to the network and in communication with the server to access the web-site, the computer comprising:
   a processor; and
   a computer readable storage medium having computer readable instructions stored thereon for execution by the processor, forming the following modules:
      a content-to-topic matching module for matching and tagging content within the web-site to a selected topic to generate tagged content;
      a viral properties extraction module for extracting viral properties of said tagged content, for identifying a commentor from said tagged content and an individual cited in the tagged content contained within the web-site, for aggregating the viral properties for the tagged content from said web-site to form aggregated viral properties of the tagged content from said web-site, for aggregating the viral properties of the tagged content having a comment from said commentor to form aggregated viral properties of the tagged content from said commentor, and for aggregating the viral properties of the tagged content citing said individual to form aggregated viral properties of the tagged content citing said individual;
      a commentor influence modeling module for computing a topical influence value of the commentor based on a linear combination of the aggregated viral properties of the tagged content from said commentor weighted with respective weights applied to each of the aggregated viral properties;
      an individual influence modeling module for computing, based on a linear combination of the aggregated viral properties extracted from the tagged content citing said individual, an influence value of said individual cited in said tagged content; and
      a site influence modeling module for computing the topical influence value of the web-site based on a linear combination of the aggregated viral properties of the tagged content within the web-site, the topical influence value of the commentor, and the influence value of said individual cited in the tagged content contained; and
   a database comprising: a top influential individuals data store for storing the influence value; a top influential commenters data store for storing the topical influence value of the commentor; and a top influential sites data store for storing the topical influence value of the web-site.

16. The system of claim 15, wherein the commentor influence modeling module further comprises:
   a commentor influence updating module for updating the influence of the commentor by calculating the topical influence value of the commentor based on viral properties extracted from the tagged content having a comment from the commentor and influence values of outlets owned by said commentor.

17. The system of claim 15, wherein the individual influence modeling module further comprises:
   an individual influence updating module for updating the topical influence of the individual by calculating the influence value of the individual based on viral properties extracted from tagged content identifying said individual and influence values of outlets owned by said individual.

* * * * *